United States Patent
Iqbal et al.

(10) Patent No.: US 12,277,441 B2
(45) Date of Patent: Apr. 15, 2025

(54) DYNAMIC SCHEDULER FOR INTERNET-OF-THINGS BASED SMART ENVIRONMENTS

(71) Applicant: Imam Abdulrahman Bin Faisal University, Dammam (SA)

(72) Inventors: Sardar Zafar Iqbal, Dammam (SA); Hina Gull, Dammam (SA); Saqib Saeed, Dammam (SA); Madeeha Saqib, Dammam (SA); Mohammed Alqahtani, Dammam (SA); Yasser A. Bamarouf, Dammam (SA); Gomathi Krishna, Dammam (SA); May Issa Aldossary, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 570 days.

(21) Appl. No.: 17/551,815

(22) Filed: Dec. 15, 2021

(65) Prior Publication Data
US 2023/0185605 A1 Jun. 15, 2023

(51) Int. Cl.
*G06F 9/48* (2006.01)
*G06F 1/08* (2006.01)

(52) U.S. Cl.
CPC .............. *G06F 9/4881* (2013.01); *G06F 1/08* (2013.01); *G06F 9/485* (2013.01)

(58) Field of Classification Search
CPC ........... G06F 9/4881; G06F 1/08; G06F 9/485
See application file for complete search history.

(56) References Cited

U.S. PATENT DOCUMENTS

| 2002/0041673 A1* | 4/2002 | Berrondo | H04M 3/5237 379/266.06 |
| 2003/0051026 A1* | 3/2003 | Carter | H04L 63/0263 709/224 |

(Continued)

OTHER PUBLICATIONS

Tani, et al. ; Smarter Round Robin Scheduling Algorithm for Cloud Computing and Big Data ; https://hal.archives-ouvertes.fr/hal-01443713 ; Jan. 23, 2017 ; 10 Pages.

(Continued)

*Primary Examiner* — Tuan C Dao
(74) *Attorney, Agent, or Firm* — Oblon, McClelland, Maier & Neustadt, L.L.P.

(57) ABSTRACT

The present disclosure is directed to a scheduler in a real time operating system for a central processing unit (CPU) that runs a number of, and diverse set of processes in a ready queue, the scheduler when executed by the CPU performs steps including dividing the ready queue of P processes into two lists, list 1 contains n processes while list 2 contains m processes, where n+m=P, averaging total execution times of the processes in each list, generating a first quantum s based on an average of each list, generating a second quantum t based on the average of each list, comparing total execution time of a candidate process which needs to be assigned to the CPU with the quantum values, and assigning the value of a quantum, based on the comparing, that is the quantum value closest to the total execution time of the candidate process, to that process as a time period for running on the CPU.

16 Claims, 10 Drawing Sheets

(56) References Cited

U.S. PATENT DOCUMENTS

| | | | | |
|---|---|---|---|---|
| 2008/0086733 | A1* | 4/2008 | Jensen | G06F 9/4881 |
| | | | | 718/102 |
| 2009/0249347 | A1* | 10/2009 | Henmi | G06F 9/45533 |
| | | | | 712/30 |
| 2018/0253291 | A1* | 9/2018 | Jeon | G06F 9/5044 |
| 2018/0307533 | A1* | 10/2018 | Tian | G06F 9/4887 |
| 2019/0340532 | A1* | 11/2019 | Ducore | G06N 10/00 |
| 2020/0356410 | A1* | 11/2020 | Gull | G06F 17/11 |
| 2022/0327413 | A1* | 10/2022 | Zhang | G06N 10/80 |
| 2024/0134711 | A1* | 4/2024 | Fang | G06N 10/00 |

OTHER PUBLICATIONS

Indusree, et al. ; Enhanced round robin CPU scheduling with burst time based time quantum ; Materials Science and Engineering 263 ; 2017 ; 9 Pages.

Biswas, et al. ; Determining Proficient Time Quantum to Improve the Performance of Round Robin Scheduling Algorithm ; I.J. Modern Education and Computer Science, 2019 ; pp. 33-40 ; 9 Pages.

* cited by examiner

DYNAMIC SCHEDULER FOR INTERNET-OF-THINGS BASED SMART ENVIRONMENTS

BACKGROUND

Technical Field

The present disclosure is directed to processor scheduling in an operating system for internet of things environments. The processor scheduling uses several variations of a round robin scheduling algorithm, each algorithm considers up to three relative time quanta. The variations calculate the relative time quanta by taking aggregate values of the actual time of processes residing in the ready queue and assigning a dynamically selected time quanta to a process.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Modern human life is heavily dependent on computing systems and one of the core components affecting the performance of these systems is the underlying operating system. Computing systems have expanded to include smart systems, such as Internet of Things (IoT), Fog computing, and Mobile Applications (Apps). As with stand-alone computing devices, these smart systems also require an operating system in order to perform various processes. An essential part of the operating system is a scheduling algorithm that dictates how resources will be allocated to the processes.

Operating systems are basic building blocks for the functioning of a computer-based system. Due to the transformation from a mainframe computer to smart devices, a similar shift has been observed in OS from batch processes to multi-tasking. Correspondingly, contemporary multi-user systems allow multiple threads to be shifted to the memory and run simultaneously. See A. Silberschatz, P. B. Galvin and G. Gagne, "CPU Scheduling" in *Operating System Concepts* 7$^{th}$ ed., New York, USA: WILEY pp. 200-254, 2005, incorporated herein by reference in its entirety. This progression required categorization of the various processes and optimized utilization of resources such as memory and processor time. These processes keep moving among the various queues in the memory throughout their life cycles. Conventionally, the job of the operating system is to select processes from the queues and assign them to the central processing unit (CPU) by using CPU schedulers. See, S. Bibi, F. Azam, S. Amjad, W. H. Butt, H. Gull et al., "An efficient SJRR CPU scheduling algorithm," *International Journal of Computer Science and Information Security*, vol. 8, no. 2, pp. 222-230, 2010, incorporated herein by reference in its entirety. CPU schedulers work on different scheduling techniques and algorithms. These algorithms are based on diverse techniques, which laid the foundation for a particular algorithm to be selected and favored for one batch of processes over the other. Certain criteria are used to compare different algorithms based on their properties such as CPU consumption, turnaround time, time it waits in memory, throughput and response time. See H. Gull, S. Z. Iqbal, S. Saeed, M. Alqahtani and Y. A. Bamarouf, "Design and evaluation of CPU scheduling algorithms based on relative time quantum: variations of Round Robin algorithm," *J. Comput. Theor. Nanosci.*, vol. 15, no. 8, pp. 2483-2488, 2019, incorporated herein by reference in its entirety.

The Internet of things (IoT) relates to physical objects (or groups of such objects) that are embedded with sensors, processing ability, software, and other technologies, and that connect and exchange data with other devices and systems over the Internet or other communications networks. In Internet of Things (IoT) most of the devices used by humans on a daily basis will be connected to other devices and systems. Examples include phones, wearable health monitoring devices, connected vehicles and augmented reality. IoT devices are often resource-constrained and have limited computational abilities. A IoT operating system ensures connectivity between IoT applications and IoT devices. The IoT operating system may use cloud computing technology to control IoT devices anywhere in the world. The IoT operating system may use Fog computing to reduce the amount of computing performed in the cloud while improving performance of processes associated with particular IoT devices.

Fog computing or fog networking, also known as fogging, is an architecture that uses edge devices to carry out a substantial amount of computation (edge computing), storage, and communication locally and routed over the Internet backbone. Fog computing enables computing services to reside at the edge of the network as opposed to servers in a data-center. Compared to cloud computing, fog computing emphasizes proximity to end-users and client objectives (e.g. operational costs, security policies, resource exploitation), dense geographical distribution and context-awareness, latency reduction and backbone bandwidth savings to achieve better quality of service (QoS) and edge analytics/stream mining, resulting in superior user-experience.

Mobile applications (commonly referred to as Apps) may access sensor devices and sensor data controlled by mobile devices, such as a GPS module, stored images, accelerometer, gyroscope, microphone, speaker, to name a few. Similar to IoT, mobile devices are resource constrained and have limited computational abilities. The operating system of mobile devices controls access to sensor devices and sensor data by Apps. The operating system of mobile devices may use cloud computing technology for performing cloud services including database management, map services, voice-based processes, and others. Mobile devices may be configured to coordinate with IoT devices.

These smart systems have additional implications on the scheduling decisions of underlying operating systems. Job quantity, job variety and job priority are dynamic and therefore the scheduling algorithms need intelligence to optimize the distribution of resources in a real time environment. With the evolution of internet of things, modern day work and home environments are becoming more intelligent. This has resulted in advances in e-healthcare (personal health trackers, hospital infrastructures), smart homes (lighting, home appliances, electricity, water and waste management, surveillance), smart workplace (infrastructure management, attendance management, communication infrastructure, robots) and transportation (self-driven cars). In such systems sensors, cameras, and computing devices coordinate to collect, monitor and review data in real time. In order to process this real time data, huge computing infrastructures are in place. The processing power of computing devices and priority of computing jobs generated in these smart systems vary enormously. Therefore, it is important to improve utilization of a CPU by increasing throughput, consequently minimizing the turnaround, response and waiting time of processes.

One of the commonly used algorithms for time sharing and multiuser operating systems is the Round Robin scheduling algorithm (RR). The functioning of the RR algorithm is reliant to the magnitude of a time interval (i.e., fixed time assigned to each process). Based on the RR algorithm, if the selected time quantum is very large, it will lead to the starvation problem (i.e., the CPU is held by a process for a long time) for the processes having large total execution time. On contrary, if the time quantum is small, it will lead to several context switches (i.e., migration from one process to another). See A. Silberschatz 2005. There have been many studies in the computing literature focusing on scheduling algorithms. Balharith and Alhaidari, have carried out a review of Round Robin and its different variations. They have categorized different contributions based on static and dynamic time quantum. Dynamic time quantum-based algorithms work on either selecting dynamic time quantum in each round or selecting dynamic time quantum for each job. See T. Balharith and F. Alhaidari, "Round Robin scheduling algorithm in CPU and cloud computing: A review," in 2nd *International Conference on Computer Applications and Information Security, ICCAIS* 2019, Riyadh, Saudi Arabia, 2019, pp. 1-7, incorporated herein by reference in its entirety. Similarly, Harki et al., have carried out a rigorous review of different scheduling algorithms used by different operating systems. The review describes turnaround time, waiting time, response time and context switching as the key factors of a scheduling algorithm. See L. Harki, N. Ahmed and A. J. Haji, "CPU scheduling techniques: A review on novel approaches strategy and performance assessment," *J. Appl. Sci. Technol. Trends, vol.* 1, no. 2, pp. 48-55, 2020, [Online]. Available: jasttorg/index.php/jasttpath/article/view/15, incorporated herein by reference in its entirety. Tyagi and Gupta have analyzed distributed computing environments and highlighted that task scheduling is very critical in improving the performance of distributed systems, therefore an effective scheduler in the distributed environment must be efficient, dynamic, transparent, and fair. The analysis provides a comparison of different scheduling algorithms and develop hierarchical classification of scheduling algorithms. See R. Tyagi and S. K. Gupta, "A survey on scheduling algorithms for parallel and distributed systems," *Advances in Intelligent Systems and Computing*, pp. 51-64, 2018, incorporated herein by reference in its entirety. Reddy et al. have developed a variation of Round Robin scheduling algorithm to achieve optimal waiting and turnaround time and keeping the context switching to minimum. The scheduling algorithm calculates the mean of given processes in advance which improves its performance. However, if a large time quantum is allocated then the algorithm's performance becomes like a first come first serve algorithm. See N. Reddy, H. Santhi, P. Gayathri and N. Jaisankar, "A new CPU scheduling algorithm using round-robin and mean of the processes," *Advances in Intelligent Systems and Computing*, vol. 732, pp. 231-240, 2018, incorporated herein by reference in its entirety. Shafi et al. developed an improvement of the Round Robin algorithm where burst time is adjusted cyclically based on processor performance. The simulation results highlighted that algorithm outperformed Round Robin, improved Round Robin, priority-based Round Robin and optimum multilevel dynamic Round Robin schemes. See U. Shafi, A. Munam, M. Shah, A. Wahid, K. Abbasi et al., "A novel amended dynamic round robin scheduling algorithm for timeshared systems," *International Arab Journal of Information Technology*, vol. 6, no. 2, pp. 90-97, 2017, incorporated herein by reference in its entirety. Dash et al. have improved the Round Robin algorithm approach by proposing Dynamic Average Burst Round Robin. This improved algorithm works by allocating dynamic time quantum rather than static time quantum. The improved algorithm showed improvements in average waiting time, turnaround time and context switching. See A. R. Dash, S. K. Sahu and S. K. Samantra, "An optimized Round Robin CPU Scheduling algorithm with dynamic time quantum," *International Journal of Computer Science, Engineering and Information Technology (IJCSEIT)*, vol. 5, no. 1, pp. 7-26, 2015, incorporated herein by reference in its entirety. Chandiramani, et al. have improved a priority scheduling algorithm which takes the time quantum equal to the shortest execution time of all the available processes. It was found that the mean turnaround and waiting time were reduced as compared to priority preemptive scheduling. See K. Chandiramani, R. Verma and M. Sivagami, "A modified priority preemptive algorithm for CPU scheduling," *Procedia Computer Science*, vol. 165, pp. 363-369, 2019, incorporated herein by reference in its entirety. Zouaoui et al. have developed a scheduling approach that combines RR and priority-based scheduling algorithms to gain the advantages of both approaches. See S. Zouaoui, L. Boussaid and A. Mtibaa, "Priority-based round-robin (PBRR) CPU scheduling algorithm," *International Journal of Electrical and Computer Engineering*, vol 9, no. 1, pp. 190-202, 2019, incorporated herein by reference in its entirety. Nayak et al., have proposed a variation of the RR algorithm, known as improved RR. This approach arranges processes based on the shortest execution time and allocated appropriate time quantum to improve performance. See D. Nayak, S. Kumar Malla and D. Debadarshini, "Improved Round Robin scheduling using dynamic time quantum," *International Journal of Computer Applications*, vol. 38, no. 5, pp. 34-38, 2012, incorporated herein by reference in its entirety. Dinkar and Deep have developed a scheduling algorithm based on ant lion optimizer and compared results with first come first serve, shortest computation time first and RR. The comparison showed less average waiting time. See S. K. Dinkar and K. Deep "A novel CPU scheduling algorithm based on ant lion optimizer," *Advances in Intelligent Systems and Computing,* 2019 incorporated herein by reference in its entirety. Eldahshan et al. have reviewed different variations of Round Robin algorithms and provided recommendations for an enhancement of RR algorithm that improves waiting and turnaround time of processes. See K. Eldahshan, A. Elkader and N. Ghazi, "Round Robin based scheduling algorithms, A comparative study," *Automatic Control and System Engineering Journal*, vol. 17, no. 2, pp. 29-42, 2017 incorporated herein by reference in its entirety. Rami has developed a self-adjusting RR scheduling algorithm based on the total execution time of the process. The self-adjusting algorithm schedules a time quantum that is based on taking the median value, but if the median is greater than 25, the value of time quantum can be adjusted to make it greater than 25. Based on the analysis, performance of RR scheduling can be improved by those methodologies as there will be less context switching between the processes. See R. J. Matarneh, "Self-Adjustment Time Quantum in Round Robin Algorithm Depending on Burst Time of the Now Running Processes," *American Journal of Applied Sciences*, vol. 6, no. 2, pp. 1831-1837, 2009 incorporated herein by reference in its entirety. Baccelli et al., have discussed that a scheduling strategy selection in IOT based operating systems should focus on task priorities, user interaction and real time response. See E. Baccelli, O. Hahm, M. Gunes, M. Wahlisch and T. Schmidt, "RIOT OS: Towards an OS for the Internet of Things," in *IEEE Conference on Computer Communications Workshops, (INFOCOM WKSHPS)*, Turin, pp. 79-80 2014 incorporated herein by reference in its entirety. Dhakad and Sharma have proposed an Adaptive Round Robin Scheduling using Shortest Burst Approach which is based on smart time slice. See V. K. Dhakad and L. Sharma, "Performance analysis of Round Robin scheduling using an adaptive approach based on smart time slice and comparison with SRR," *International Journal of Advances in Engineering & Technology*, vol. 3, no. 2, pp. 2231-1963, 2012 incorporated herein by reference in its entirety.

Despite these various approaches there is still a need for scheduling algorithms having improved processing time in view of the challenges of advanced computing paradigms and infrastructures.

SUMMARY

In an exemplary embodiment, a scheduling method in a real time operating system for a central processing unit (CPU) that runs a number of, and diverse set of processes in a ready queue, the scheduling method, performed by the CPU, can include dividing the ready queue of P processes into two lists, list 1 contains n processes while list 2 contains m processes, where n+m=P; averaging total execution times of the processes in each list; generating a first quantum s based on an average of each list; generating a second quantum t based on the average of each list; comparing total execution time of a candidate process which needs to be assigned to the CPU with the quantum values; and assigning the value of a quantum, based on the comparing, that is the quantum value closest to the total execution time of the candidate process, to that process as a time period for running on the CPU.

In another exemplary embodiment, a scheduler scheduler in a real time operating system for a central processing unit (CPU) that runs a number of, and diverse set of processes in a ready queue, the scheduler when executed by the CPU can perform steps including dividing the ready queue of P processes into two lists, list 1 contains n processes while list 2 contains m processes, where n+m=P; averaging total execution times of the processes in each list; generating a first quantum s based on an average of each list; generating a second quantum t based on the average of each list; comparing total execution time of a candidate process which needs to be assigned to the CPU with the quantum values; and assigning the value of a quantum, based on the comparing, that is the quantum value closest to the total execution time of the candidate process, to that process as a time period for running on the CPU.

In another exemplary embodiment, an embedded real time operating system for a microcontroller that runs a number of, and diverse set of processes in a ready queue, the embedded real time operating system comprising a scheduler, the scheduler when executed by the microcontroller can perform steps including dividing the ready queue of P processes into two lists, list 1 contains n processes while list 2 contains m processes, where n+m=P; averaging total execution times of the processes in each list; generating a first quantum s based on an average of each list; generating a second quantum t based on the average of each list; comparing total execution time of a candidate process which needs to be assigned to the a central processing unit (CPU) of the microcontroller with the quantum values; and assigning the value of a quantum, based on the comparing, that is the quantum value closest to the total execution time of the candidate process, to that process as a time period for running on the CPU.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
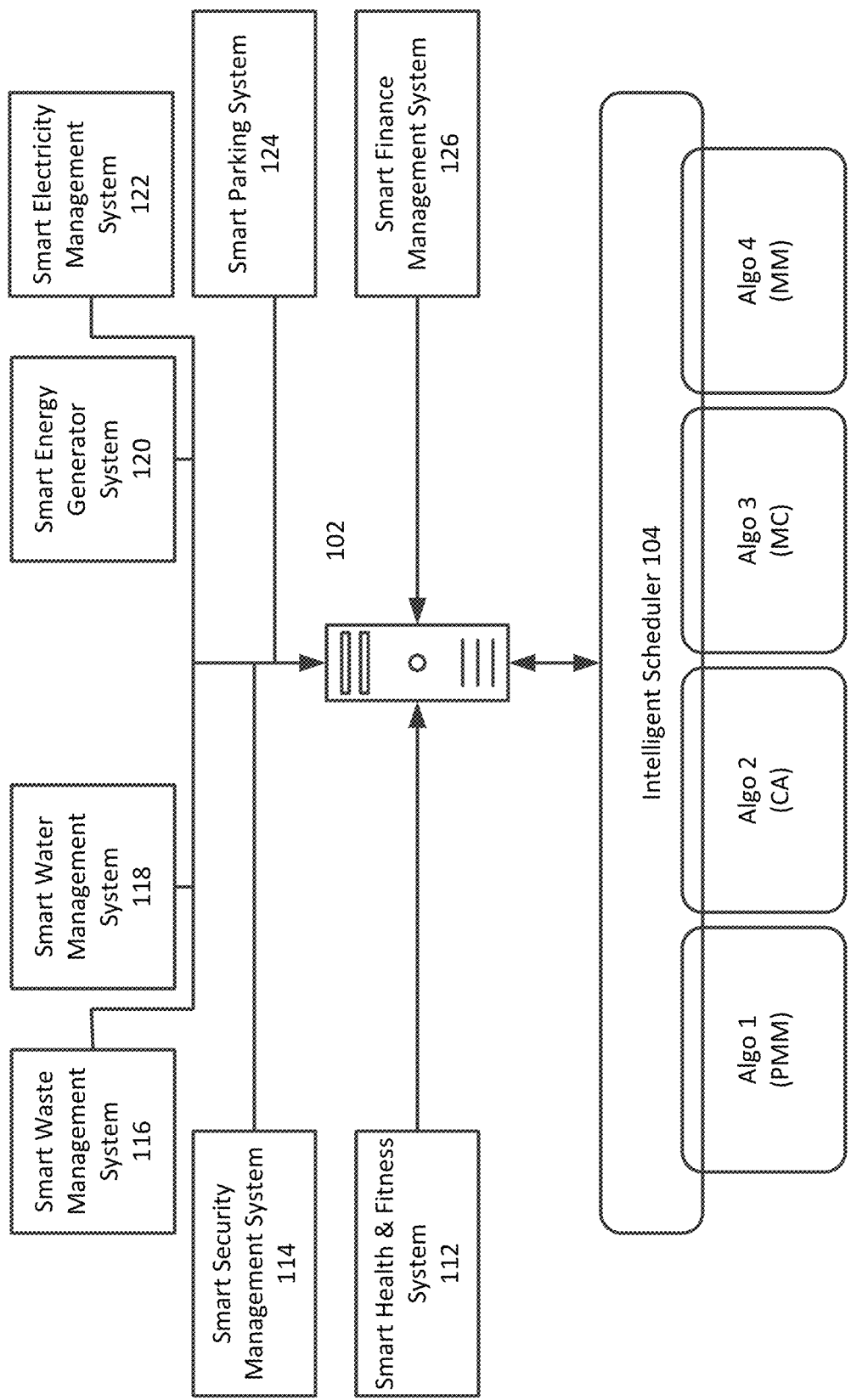
FIG. 1 is a block diagram of an intelligent scheduler in accordance with an exemplary aspect of the disclosure.

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

Furthermore, the terms "approximately," "approximate," "about," and similar terms generally refer to ranges that include the identified value within a margin of 20%, 10%, or preferably 5%, and any values therebetween.

The term "quantum" refers to the period of time for which a process is allowed to run uninterrupted in a preemptive multitasking operating system.

The term "time slice" refers to a short interval of time allotted to each user or program in a multitasking or time-sharing system. Time slices are typically in milliseconds.

The term "ready queue", "ready list" or "run queue" keeps a list of all processes that are ready to run. Each of these processes is assigned a "burst time".

The term "burst time" refers to the amount of time needed to run a process in the ready list.

The term "turnaround time" is the total time the CPU takes to complete execution of a process that is assigned to it by the scheduler.

The term "waiting time" is the time a process stays in a waiting state, residing in the ready queue, before it is assigned to the CPU.

The term "response time" is the time measured from when the process requests the CPU for the first time; i.e., the process submits its request for the CPU upon the first response it receives from the CPU.

Aspects of this disclosure are directed to a scheduling method. A scheduling method has been developed that is based on relative time quantum, see U.S. Published Patent Application number 2020/0356410, to Gull et al., incorporated herein by reference in its entirety. The '410 patent application is directed to dual core processor scheduling based on relative time quantum. A time quantum is calculated by taking the average of the process burst times for each roughly half portion of a ready queue list and then applying addition and subtraction to the relative values. A first CPU is assigned the quantum based on addition while the second CPU is assigned the quantum based on subtraction. In this approach only one-time quanta is selected for each core. On the other hand, in process scheduling for smart systems, additional factors come into play including process execution time and the nature and types of processes, where the process types are dynamic.

In this disclosure, a Job is a unit of work that is scheduled by a job scheduler. Jobs may be executed using batch processing or multitasking. A process relates to an executing program in computer memory. To execute a process in a computer system, resources such as memory, CPU time, and input-output devices are used. The operating system allocates these resources to different processes. Processes are stored in a ready queue and are scheduled by a process scheduler.

As Internet of Things (IoT) and other smart systems are on the rise and these systems are time bound and run with strict time constraints. Smart devices that are part of an IoT environment include microcontroller controlled devices having embedded operating systems for networked, memory-constrained systems with low-power wireless communication between devices. Therefore, an optimal scheduling strategy that takes into account strict time constraints is needed to improve system performance. To meet the processing deadlines, a scheduling strategy should be real time to complete the job within required time limits as well as to improve the waiting time of processes with less context switching, see A. Silberschatz et al. (2005). Several scheduling algorithms and strategies have been developed in the past to deal with the challenge of real time performance of these applications and their scheduling problems, see S. Bibi et al. (2010). Additionally, as modern devices and IoT have elevated the complexity of scheduling, there is a need to develop an improved scheduling strategy that works intelligently to support such an environment.

There may be no single algorithm that is best for every situation, and in the case of IoT environments where the nature of each job requires different time slots, having different priority and the timely execution of processing is of utmost importance. FIG. 1 is a high level block diagram of an intelligent scheduler in accordance with an exemplary aspect of the disclosure. The intelligent scheduler 104 is part of an operating system for a computer system 102. The intelligent scheduler 104 decides the best performing algorithm from among alternative scheduling algorithms for given set of processes and dynamically allocates time quanta to each process.

In disclosed embodiments, the intelligent scheduler 104 makes a decision to select between the alternative scheduling algorithms based on computing resources that are available to a particular IoT device, the job environment, such as priority of computing jobs, as well as degree of user interaction. One type of job can include a job to perform interaction with local IoT devices. This interaction job may involve acquisition of observations and their forwarding to remote servers. Another type of job can include a job to perform local analysis and processing of observations acquired by local IoT devices. Another type of job can include a job to perform interaction with remote IoT devices over the Internet. Another type of job can include a job to perform specific data analysis and processing. The specific data analysis and processing can involve reacting to requests from mobile and web clients, executing data processing algorithms, and generating output. Another type of job can include a job to perform interaction with a user interface, e.g., user queries. Each of these types of jobs require varying processing time, so there is a need to identify optimal scheduling strategy for allocating time quanta to finish all jobs efficiently. At a given time, the jobs present in ready queue may be optimally handled by one algorithm, however at another instance, due to a different processing time requirement the same algorithm may not be efficient. The intelligent scheduler can consider time quantum required for each job present in the ready queue at current time, and then it will automatically select which of the four algorithms can efficiently complete the processes. Based on this calculation the optimal algorithm will be used for allocation of a time slice and with each new job arrival in ready queue, the optimal algorithm is re-evaluated.

The various types of jobs can include various processes. Some jobs may involve a large number of processes, and may involve a variety of types of processes. Some types of processes may involve interrupts, e.g., to handle sensor information from external sources, user interface inputs. Processes may vary in total processing time. Processes may vary as to required resources to carry out the process. The intelligent scheduler 104 can make the decision for switching between the scheduling algorithms based on the number of processes in the ready queue. The intelligent scheduler 104 can make the decision for switching between the scheduling algorithms based on the variety of processes in the ready queue. Based on the requirements of a job at hand, the intelligent scheduler will select an optimal performing algorithm from among the alternative scheduling algorithms, e.g., Algorithm 1, Algorithm 2, Algorithm 3, Algorithm 4. This dynamic selection of an algorithm improves the process waiting time in smart systems, such as IoT systems.

In one embodiment, the intelligent scheduler 104 may make a decision as to which algorithm to use by partially performing each algorithm, then choosing one of the alternative scheduling algorithms, e.g., based on how close the burst value of a process is to v.

In one embodiment, the intelligent scheduler 104 may be implemented using a machine learning model. The machine learning model may be trained with a set of processes in a ready queue as input and the four scheduling algorithms as an output. One of the four scheduling algorithms will be selected as the optimum algorithm for the set of processes in the ready queue. The machine learning model may be any of supervised learning algorithms, such as decision tree, support vector machine, and artificial neural network. The support vector machine algorithm may be arranged as multiple support vector machine models to accommodate for the classification for the four scheduling algorithms. Classification accuracy may be improved using ensemble learning with the supervised learning algorithm.

IoT environments can include e-healthcare (personal health trackers, hospital infrastructures), smart homes (lighting, home appliances, electricity, water and waste management, surveillance), smart workplace (infrastructure management, attendance management, communication infrastructure, robots) and transportation (self-driven cars). Regarding FIG. 1, IoT systems may be implemented as a smart health and fitness system 112, a smart security management system 114, a smart waste management system 116, a smart water management system 118, a smart energy generator system 120, a smart electricity management system 122, a smart parking system 124, and a smart finance management system 126, to name a few.

Algorithm 1 (Plus Minus Mid—PMM) generates three-time quantum and dynamically selects the time quantum to the candidate process which is close to the total execution time (also referred to as Burst Time) of that process. The algorithm follows the process by averaging the total execution times of the processes in each list, adding the averages to generate a first quantum s and subtracting the averages to generate a second quantum t.

Algorithm 2 (Close to Average—CA) works on generating two-time quantum and dynamically selecting and assigning the time quantum to the candidate process which is close to the total execution time of that process. The algorithm follows the process by averaging the total execution times of the processes in each list, average of first list will be the first quantum s and the average of second list will be the second quantum t.

Algorithm 3 (Close to Mid Value—MC) generates three-time quantum and dynamically selects the time quantum to the candidate process which is close to the total execution time of that process. The algorithm follows the process by averaging the total execution times of the processes in each list, average of first list will be the first quantum s and the average of second list will be the second quantum t. The algorithm also takes the middle value v of the whole list of processes lying in ready queue.

Algorithm 4 (Max Min—MM) works on generating two-time quantum and dynamically selecting the time quantum to the candidate process which is close to the total execution time of that process. The algorithm follows the process by averaging the total execution times of the processes in each list, larger average will be the first quantum s and smaller one will be second quantum t.

Figure 2:
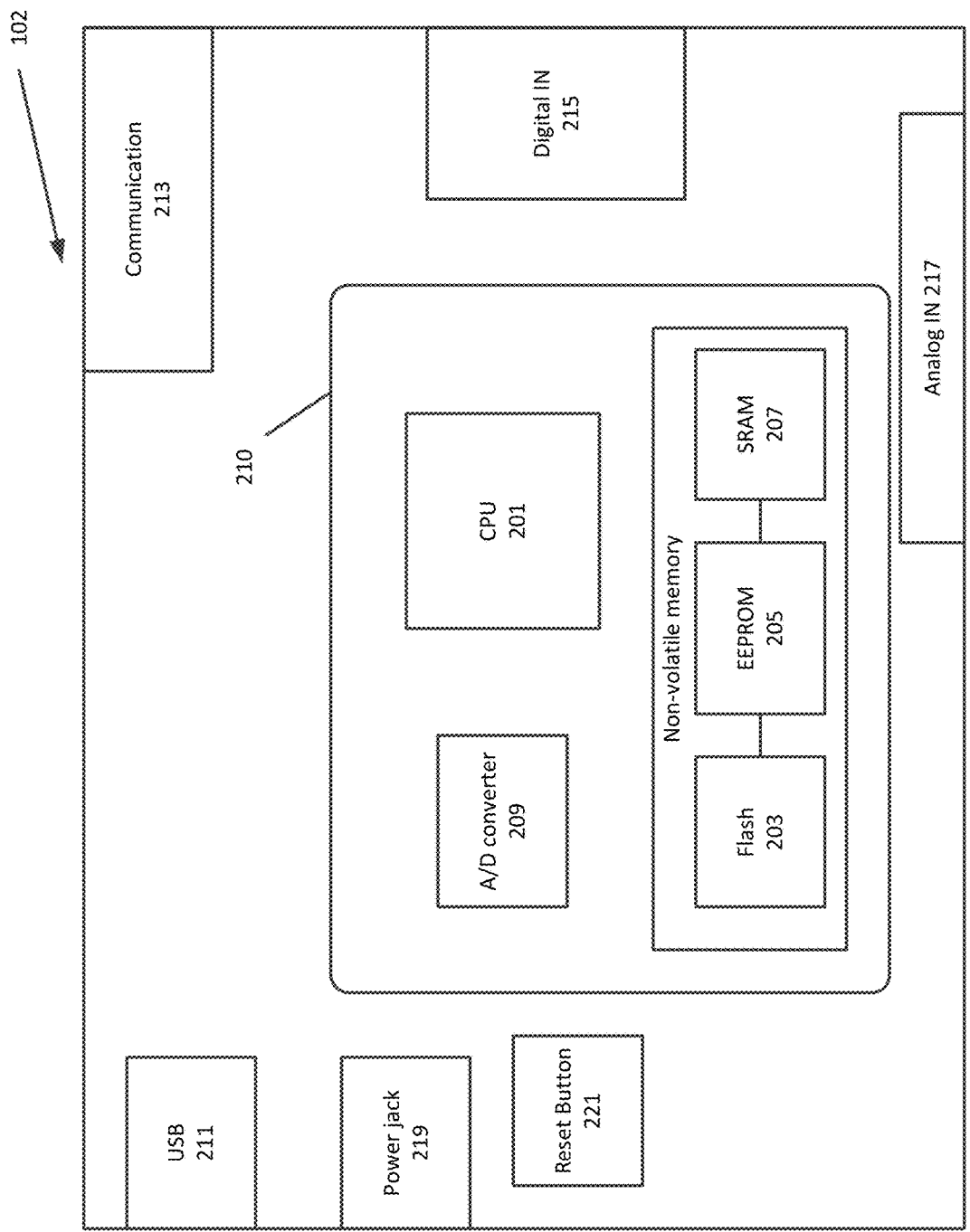
FIG. 2 illustrates a hardware block diagram of a computing system according to exemplary embodiments.

FIG. 2 illustrates a hardware block diagram of a computing system according to exemplary embodiments. The computer-based control system 102 is typically based on a microcontroller. A microcontroller may contain one or more processor cores (CPUs) along with memory (volatile and non-volatile) and programmable input/output peripherals. Program memory in the form of flash, ROM, EPROM, or EEPROM is often included on chip, as well as a secondary RAM for data storage. In one embodiment, the computer-based system 102 is an integrated circuit board 102 with a microcontroller 210. The board includes digital I/O pins 215, analog inputs 217, hardware serial ports 213, a USB connection 211, a power jack 219, and a reset button 221. It should be understood that other microcontroller configurations are possible. Variations can include the number of pins, whether or not the board includes communication ports or a reset button.

The microcontroller may include flash memory 203, SRAM 207, EEPROM 205, general purpose I/O lines, general purpose registers, a real time counter, flexible timer/counters, an A/D converter 209, and a JTAG interface for on-chip debugging. The microcontroller 210 is a single SOC. Microcontrollers may vary based on the number of processing cores, size of non-volatile memory, the size of data memory, as well as whether or not it includes an A/D converter or D/A converter.

The above-described hardware description is a non-limiting example of corresponding structure for performing the functionality described herein.

The computer-based control system 102 configured with a microcontroller 210 typically controls execution of processes using an embedded operating system. An embedded operating system is an operating system for embedded devices. In IoT devices, the embedded operating system is typically one that is limited to a relatively small memory and low power, but is required to control various processes to run in real time. Real-Time Processing involves continuous input, process, and output of data. It performs processes in a short period of time, providing near-instantaneous output. IoT devices often are expected to run unattended for months or years, without a user interface, on a minimal energy budget, while responding to application-specific events.

Figure 3:
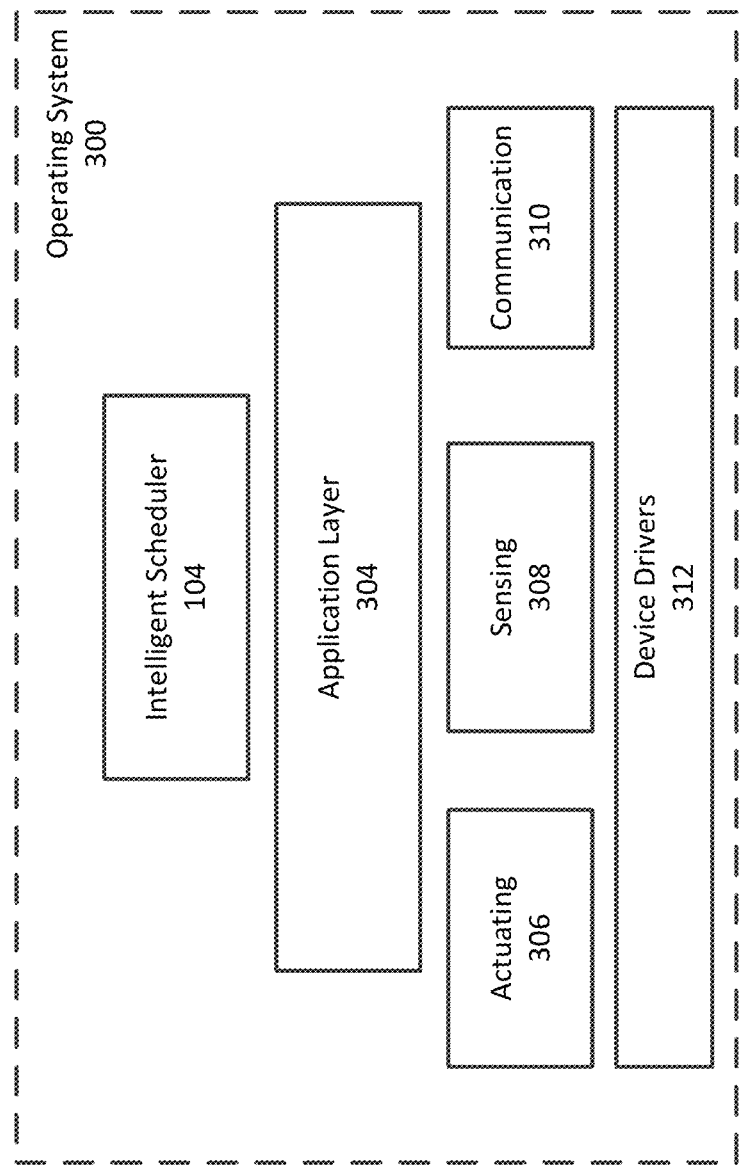
FIG. 3 is a block diagram of an embedded operating system stack.

FIG. 3 is a block diagram of an embedded operating system stack. The operating system 300 can include the intelligent scheduler 104, an application layer 304, specific layers for actuating 306, sensing 308, and communication 310. In addition, the operating system 300 can include device drivers 312 which provide hardware abstractions for an A/D converter, clock, and/or other devices that make up the microcontroller.

A microcontroller 210 may have a single CPU 201, or may have multiple processing cores. In the case of multiple processing cores, each core separately runs the operating system kernel, and cooperates with other cores by reading/writing a shared memory. One of the shared data structures maintained by a kernel is the list of processes that are ready to run (shared ready queue), and are just waiting for a timeslice to run in. The kernel's process scheduler runs on the core that needs to figure out what to do next. Scheduling works by figuring out what the CPU/core should do at a particular point in time, based on which tasks are ready to run. Hence, generally the kernel on each core decides what that core should be running; by running the same schedule( ) function on a shared data-structure of tasks that are ready to run (shared ready queue).

It should be noted that an operating system may include other scheduling functions. There generally are three types of schedulers: Job scheduler also known as the Long term scheduler, Short term scheduler also known as the CPU scheduler, and the Medium term scheduler. Job scheduler puts things from job queue to ready queue, the CPU scheduler takes things from ready queue to running state. Each scheduler is just like any other software, it must be run on a CPU/core. The present disclosure relates to the CPU scheduler.

Disclosed embodiments relate to four variations of Round Robin scheduling algorithm, which select dynamic time quantum intelligently based on the total execution time (or burst time) of the candidate process. The scheduling algorithms are part of an embedded operating system kernel (for example, a schedule function, referred to herein as a "scheduler") and are run by the CPU/core that decides what that CPU/core should be running. The main feature of these variations is to divide the list of processes and then apply their different technique to achieve maximum fair distribution of time quantum. The algorithms will assign time quantum to each process in real time, as each process will have its own time quantum.

Although the algorithms are identified as Algorithm 1, Algorithm 2, etc., the numbering of the algorithms is for purposes of description, and is not intended to be an ordering or priority of the algorithms as they are performed by the CPU/core scheduler. Also, each algorithm includes a calculation of waiting time, turnaround time, average waiting time and average turnaround time of processes in order to measure relative performance of the algorithms. Complete descriptions of these algorithms are given below:

[Algorithm 1]

Figure 4:
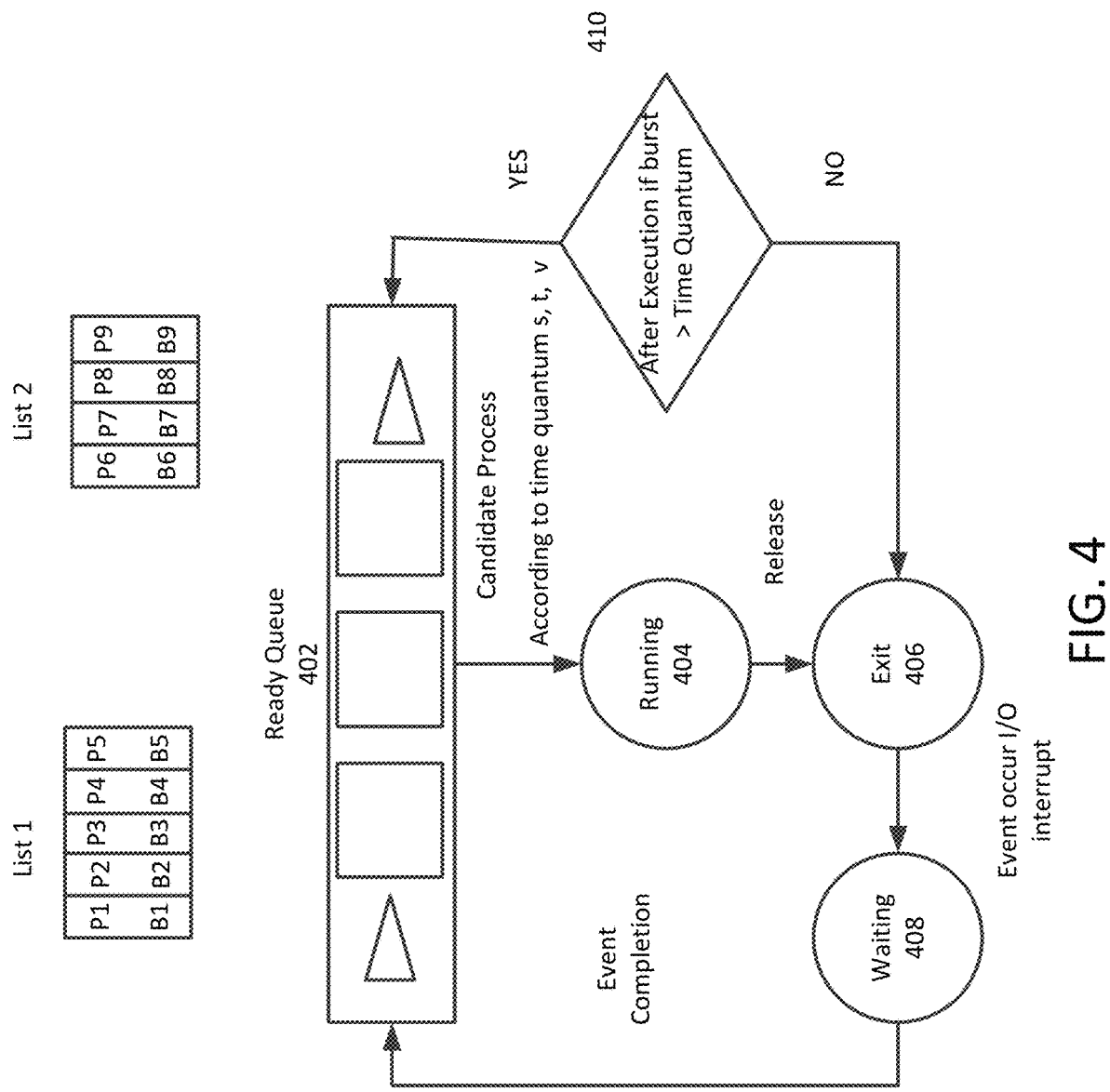
FIG. 4 illustrates a time quantum calculation process and a block diagram of the process according to exemplary embodiments.

FIG. 4 is a block diagram of a time quantum calculation process.

Algorithm 1 (Plus Minus Mid PMM) works by dividing the ready queue of P processes into two lists. List 1 contains n processes while list 2 contains m processes, where n+m=P. Algorithm also takes the middle value v of the whole list of process lying in ready queue by using the following equation:

$$v = \begin{cases} x_{\frac{p+1}{2}} & \text{if } p = 2k+1 \\ \frac{x_{\frac{p}{2}} + x_{\frac{p}{2}+1}}{2} & \text{if } p = 2k \end{cases} \quad (1)$$

Algorithm 1 works on generating three-time quantum and dynamically selecting and assigning the time quantum to the candidate process which is close to the total execution time (also called burst time) of that process. The algorithm follows the process by averaging the total execution times of the processes in each list (Avg1=B1+B2+B3+B4+B5; Avg2=B6+B7+B8+B9), adding the averages to generate a first quantum s and subtracting the averages to generate a second quantum t. Average of list 1 is computed by the given equation:

$$A1 = \frac{1}{n} * \sum_{i=1}^{n}(x_i) \quad (2)$$

Where A1=Average of list 1 (Avg1), n=number of processes, x1=the value of each item in the list of numbers being averaged. Similarly, average 2 can be computed by the same equation:

$$A2 = \frac{1}{m} * \sum_{i=1}^{m}(x_i) \quad (3)$$

Where A2=Average of list 2 (Avg2), m=number of processes, x1=the value of each item in the list of numbers being averaged. Here rest of the two-time quantum s and t are calculated as follows:

$s = A1 + A2$ $t = A1 - A2$

The candidate process which needs to be assigned to a CPU is compared with v, s and t. The value of the quantum that is near the total execution time of the candidate process is assigned to that process for running 404. After running 404, the CPU releases the process 406, and may incur a waiting period 408, for example, due to an I/O interrupt. In the case that the burst time>time quantum (YES in 410), a remaining process is at the head of the ready queue 402. Otherwise, upon completion of the I/O interrupt, a new candidate process is compared.

Figure 5:
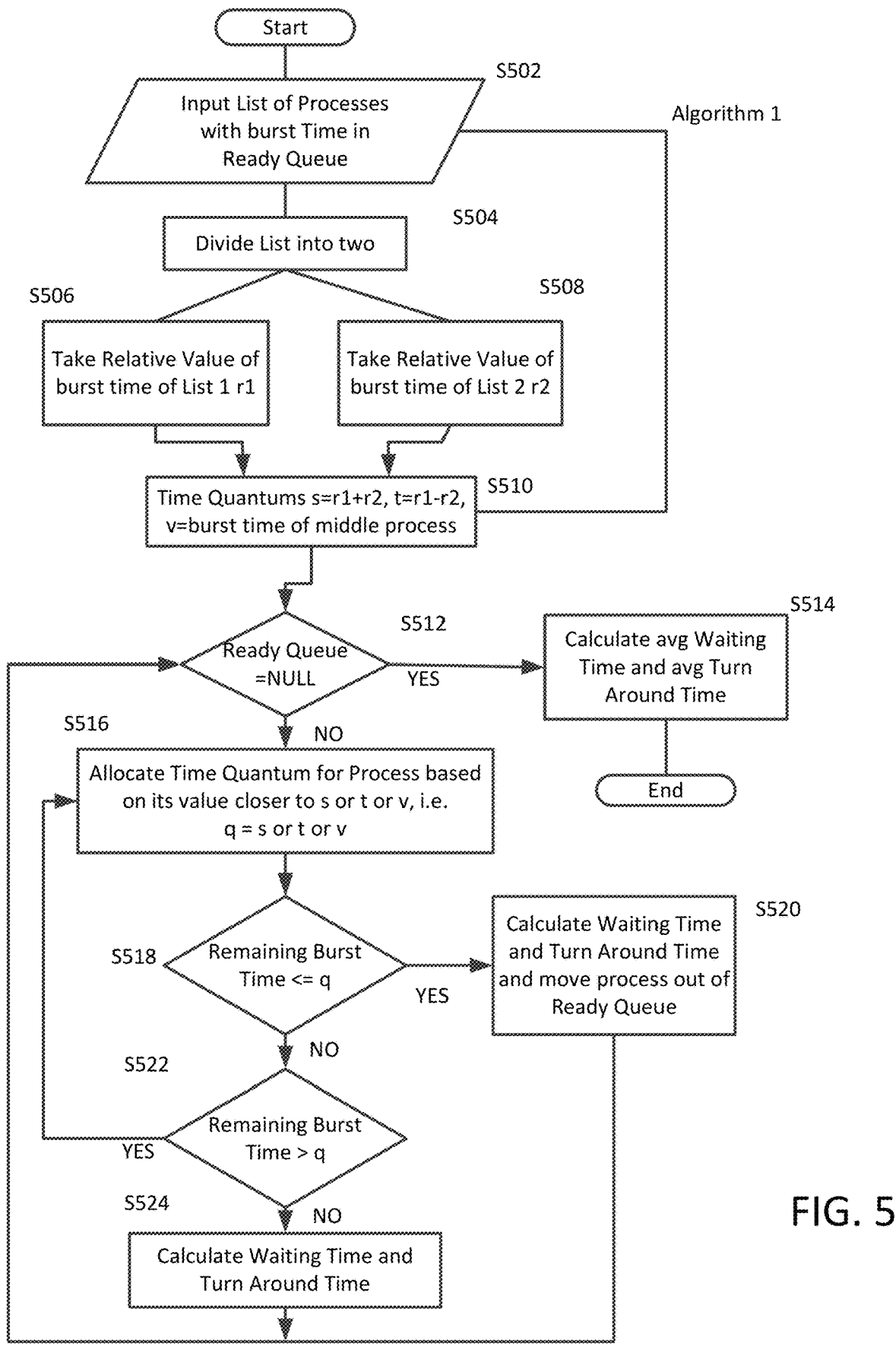
FIG. 5 is a flowchart of Algorithm 1 according to exemplary embodiments.

FIG. 5 is a flowchart of algorithm 1. In one embodiment, the scheduler performs scheduling algorithms, including Algorithm 1, on a CPU or core. At S502, the algorithm is based on an initial state in which the Ready Queue 402 is loaded with a list of processes, each having a burst time. The length of the Ready Queue 402 is dependent on the size of memory dedicated to the ready queue in the particular computer system. For example, the CPU 201 may have a volatile memory dedicated to the Ready Queue 402. The maximum number of processes in the list of processes is limited to the length of the Ready Queue 402. The list of processes may be one or more processes up to the maximum number of processes. In S504, the scheduler divides the list into two lists of substantially equal length. In steps S506 and S508, the scheduler determines the relative value of the burst time of List 1 and the relative value of the burst time of List 2. In S510, the scheduler determines values of time quantums s, t, and v. In algorithm 1, time quantum s=r1+r2; time quantum t=r1−r2; time quantum v is the burst time of a middle process. In the example of List 1 and List 2 in FIG. 4, v=B5 for middle process P5.

In S512, the scheduler checks if the ready queue 402 is empty. At the end of the ready queue, or when the ready queue 402 becomes empty, in S514, the scheduler determines an average waiting time and average turnaround time. The algorithm ends.

In S516, the scheduler allocates time quantum for process based on its value closer to sort or v.

In S518, the scheduler detects whether the remaining burst time is less than the time quantum. When "YES" in S518, in S520, the scheduler calculates waiting time and turn around time and moves the process out of Ready Queue 402. Otherwise, "NO" in S518, in S524, the scheduler calculates the waiting time and turn around time.

In S512, the scheduler checks if the ready queue 402 is empty.

If the ready queue 402 is not empty (NO in S512), the scheduler repeats steps S516-S524.

See the following Pseudocode of Algorithm 1 as an exemplary implementation of the algorithm. In the Pseudocode, the following variables are used:

--- processList - list of processes in the ready queue.
list1 = half of the processList
list2 - other half of the processList
quantum - selected time quantum
s - calculated time quantum
t - calculated time quantum
v - value of burst time for middle process in processList
bt - burst time
waitTime - waiting time of a process in processList
turnTime - turnaround time of a process
avgWTime - average waiting time of processes in processList
avgTTime - average turn around time of processes in processList

```
list1←0 list2←0, r1←0, r2←0, quantum←0, s, t, v ← 0
m←len/2
r1←sum(list1)/m
r2←sum(list2)/(len-m)
    s←avg1+avg2
    t←avg1-avg2
    v←mid (processList)
sum←0, waitTime←0, turnTime←0, avgWTime←0, avgTTime←0, mid←0
max←Max(s, Max(t, v))
min←Min(s, Min(t, v))
IF s < t && t < v || v < t && t < s))
THEN mid = t
    ELSE IF t < s && s<v || v < s && s < t
        mid = t
    ELSE
        mid = v
DO FOR i ← 0 to len
    IF bt_i < max && bt_i < mid
        THEN quantum = min
        ELSE IF bt_i < max && bt_i == mid
            THEN quantum = mid
        ELSE quantum = max;
    IF bt_i_ > quantum
    THEN bt_i_ = quantum
    FOR j ←0 to len
        THEN if j! = i && bt_j_! = 0
        THEN waitTime_j_+=quantum
    ELSE
        FOR j←0 to len
        Then if j! = i && bt_j_! = 0
        Then waitTime _j_+=bt[i]
    bt_i_←0
    FOR k←0 to len
        sum←sum+bt_k
    WHILE sum !=0
        FOR l←0 to len
        turnTime_i_←waitTime_i_+processList_i
```

[Algorithm 2]

Figure 6:
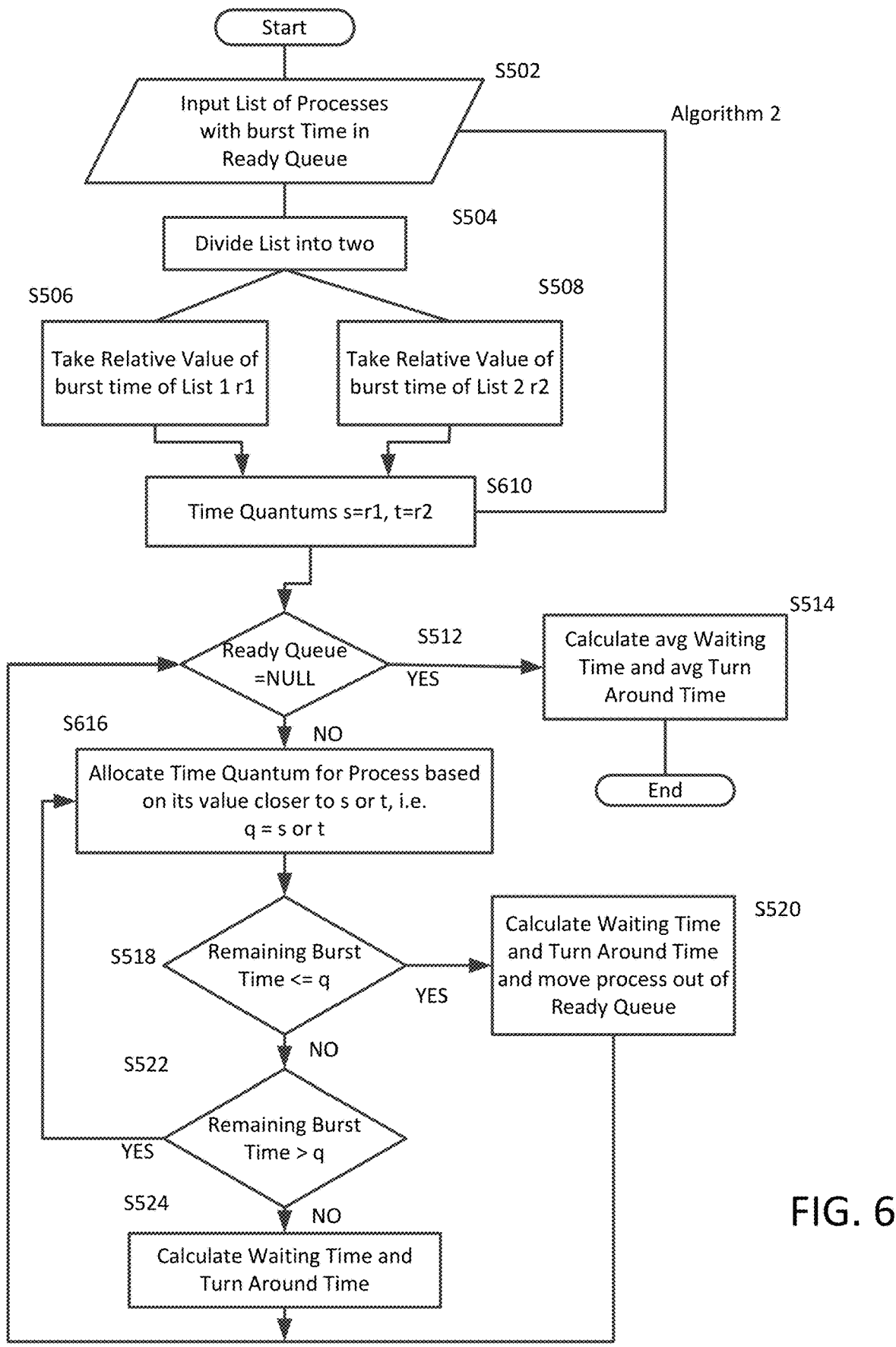
FIG. 6 is a flowchart of Algorithm 2 according to exemplary embodiments.

The flowchart of algorithm 2 is shown in FIG. 6. The algorithm 2 (called close to average CA), similar to algorithm 1 in FIG. 5, works by dividing the ready queue 402 of P processes into two lists (S504). List 1 contains n processes while list 2 contains m processes, where n+m=P. The algorithm 2 generates a two-time quantum and dynamically selects and assigs the time quantum to the candidate process which is close to the total execution time of that process. The algorithm follows the process by averaging the total execution times of the processes in each list (S506, S508), in S610, the average of first list will be the first quantum s and the average of the second list will be the second quantum t. The candidate process which needs to be assigned to CPU is compared with s and t.

Similar to algorithm 1 in FIG. 5, in S512, the scheduler checks if the ready queue 402 is empty. At the end of the ready queue, or when the ready queue 402 becomes empty, in S514, the scheduler determines an average waiting time and average turnaround time. The algorithm ends.

In S616, the value of the quantum that is near (closer to) the total execution time (burst time) of the candidate process is assigned as the quantum for running 404. After running 404, the CPU releases the process 406, and may incur a waiting period 408, for example, due to an I/O interrupt. In the case that the burst time>time quantum (YES in 410), a remaining portion of a process may be at the head of the ready queue 402. Otherwise, upon completion of the I/O interrupt, a new candidate process is compared. Averages and time quantum s and t are calculated by the formula given in equations 1, 2 and 3.

Similar to algorithm 1 in FIG. 5, in S518, the scheduler detects whether the remaining burst time is less than the time quantum. When "YES" in S518, in S520, the scheduler calculates waiting time and turn around time and moves the process out of Ready Queue 402. Otherwise, "NO" in S518, in S524, the scheduler calculates the waiting time and turn around time.

Pseudocode as an implementation of Algorithm 2 is as follows.

```
list1←0 list2←0, r1←0, r2←0, quantum←0, s, t, v ← 0
m←len/2
r1←sum(list1)/m, r2←sum(list2)/(len-m)
    s←avg1+avg2
    t←avg1-avg2
    v←mid (processList)
sum←0, waitTime←0, turnTime←0, avgWTime←0, avgTTime←0, mid←0
max←Max(s, Max(t, v))
min←Min(s, Min(t, v))
IF s < t && t < v || v < t && t < s))
THEN mid = t
    ELSE IF t < s && s<v || v < s && s < t
```

```
        mid = t
    ELSE
        mid = v
DO FOR i ← 0 to len
    IF bt_i < max && bt_i < mid
        THEN quantum = min
    ELSE IF bt_i < max && bt_i == mid
        THEN quantum = mid
    ELSE quantum = max;
    IF bt_i_ > quantum
    THEN bt_i_ = quantum
    FOR j ←0 to len
        THEN if j! = i && bt_j_! = 0
        THEN waitTime_j_+=quantum
    ELSE
        FOR j←0 to len
        Then if j! = i && bt_j_! = 0
        Then waitTime _j_+=bt[i]
    bt_i_←0
    FOR k←0 to len
        sum←sum+bt_k
    WHILE sum !=0
        FOR l←0 to len
        turnTime_i_←waitTime_i_+processList_i
        FOR j←0 to len
        avgWTime +=waitTime_j
        FOR j←0 to len
        avgTTime+=turnTime_j
```

[Algorithm 3]

Figure 7:
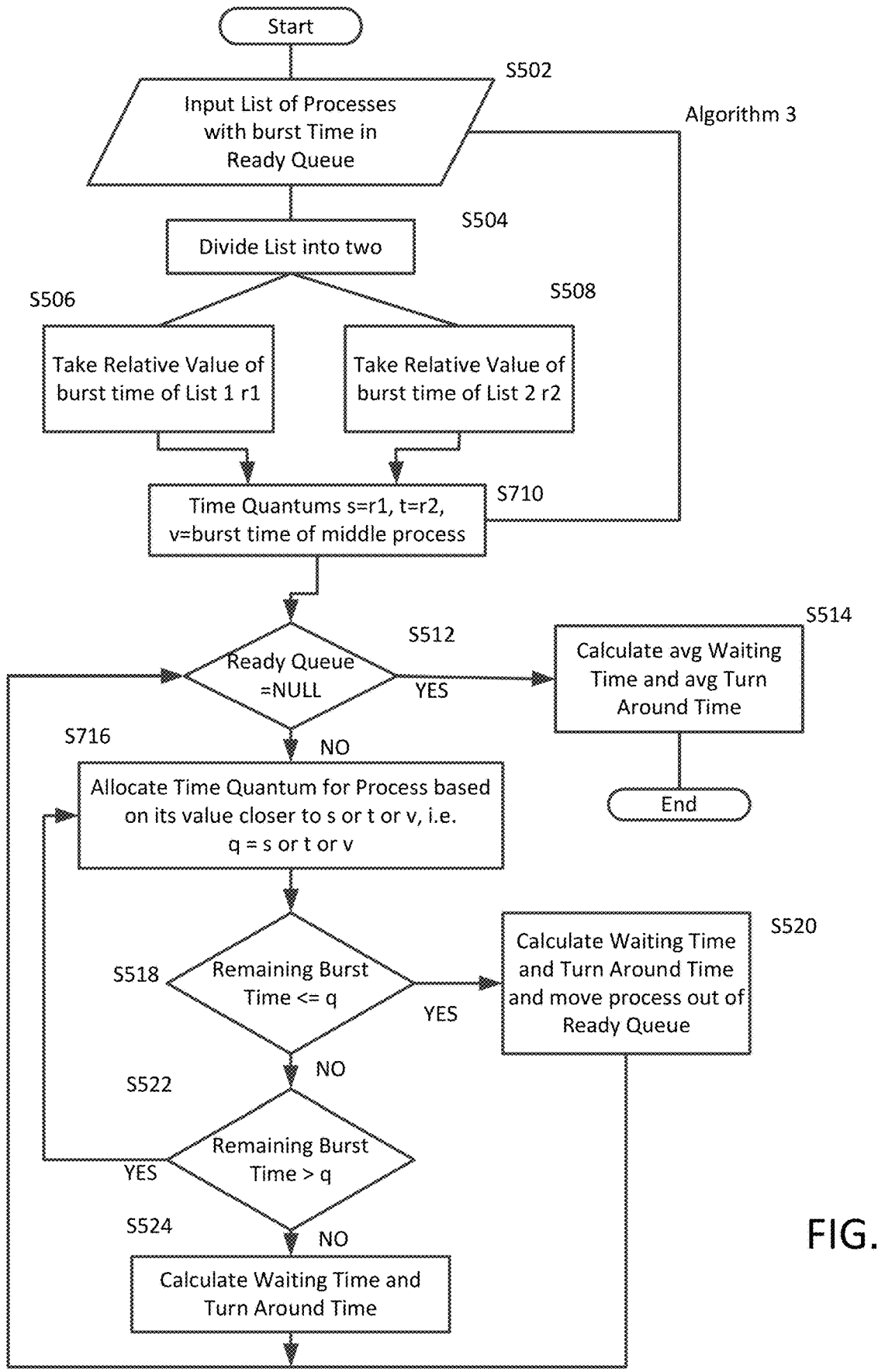
FIG. 7 is a flowchart of Algorithm 3 according to exemplary embodiments.

The flowchart of algorithm 3 is shown in FIG. 7. The algorithm 3 (called close to Mid Value MC), similar to algorithm 1 in FIG. 5 works by dividing the ready queue of P processes into two lists (S504). List 1 contains n processes while list 2 contains m processes, where n+m=P. Algorithm also takes the middle value v of the whole list of processes lying in ready queue. Algorithm works on generating three-time quantum and dynamically selecting and assigning the time quantum to the candidate process which is close to the total execution time (burst time) of that process. Algorithm 3 follows the process by averaging the total execution times of the processes in each list (S506, S508), in S710) the average of first list will be the first quantum s and the average of second list will be the second quantum t. The candidate process which needs to be assigned to CPU is compared with v, s and t.

Similar to algorithm 1 in FIG. 5, in S512, the scheduler checks if the ready queue 402 is empty. At the end of the ready queue, or when the ready queue 402 becomes empty, in S514, the scheduler determines an average waiting time and average turnaround time. The algorithm ends.

In S716, the value of the quantum that is near (closer to) the total execution time of the candidate process is assigned to that process for running. Averages and the time quantum s and t are calculated by the formula given in equations 1, 2 and 3.

Similar to algorithm 1 in FIG. 5, in S518, the scheduler detects whether the remaining burst time is less than the time quantum. When "YES" in S518, in S520, the scheduler calculates waiting time and turn around time and moves the process out of Ready Queue 402. Otherwise, "NO" in S518, in S524, the scheduler calculates the waiting time and turn around time.

Pseudocode as an example implementation of Algorithm 3 is as follows.

```
list1←0 list2←0, r1←0, r2←0, quantum←0, s, t, v ← 0
m←len/2
r1←sum(list1)/m
r2←sum(list2)/(len−m)
    s←r1
    t←r2
sum←0, waitTime←0, turnTime←0, avgWTime←0, avgTTime←0, mid←0
max←Max(s, t)
min←Min(s, t)
DO FOR i ← 0 to len
    IF bt_i < max
        THEN quantum = min
        ELSE quantum = max;
    IF bt_i_ > quantum
    THEN bt_i_-= quantum
    FOR j ←0 to len
        THEN if j! = i && bt_j_! = 0
        THEN waitTime_j_+=quantum
    ELSE
        FOR j←0 to len
        Then if j! = i && bt_j_! = 0
```

-continued

```
        Then waitTime __j__+=bt[i]
bt__i__←0
FOR k←0 to len
    sum←sum+bt__k
WHILE sum !=0
    FOR l←0 to len
    turnTime__i__←waitTime__i__+processList__i
    FOR j←0 to len
    avgWTime +=waitTime__j
    FOR j←0 to len
        avgTTime+=turnTime__j
```

[Algorithm 4]

Figure 8:
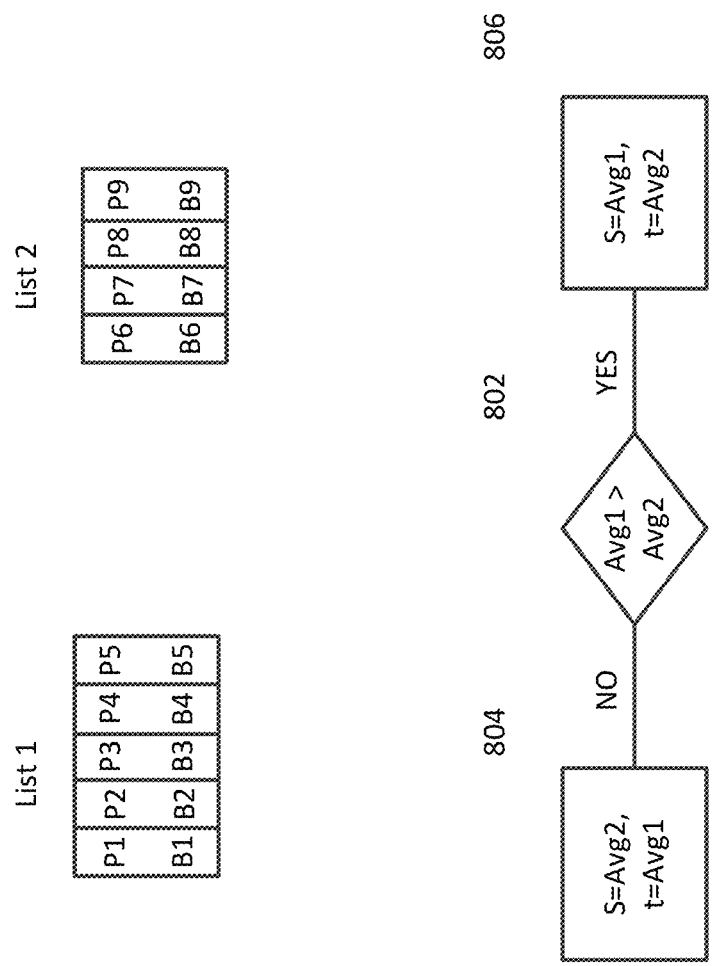
FIG. 8 is a block diagram of process according to exemplary embodiments.
Figure 9:
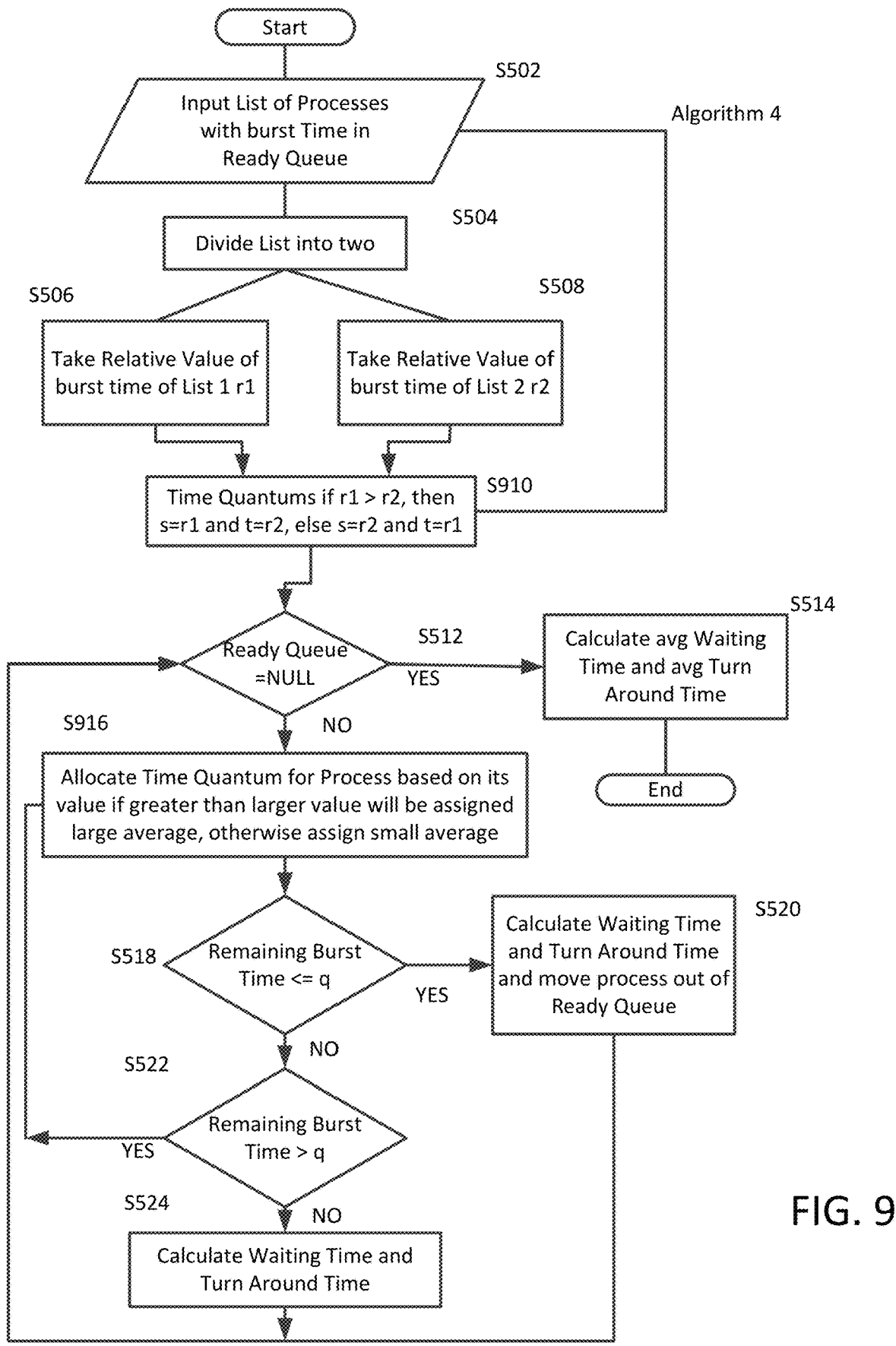
FIG. 9 is a flowchart of Algorithm 4 according to exemplary embodiments.

The flowchart of algorithm 4 is shown in FIG. 9. The time quantum calculation of the process is shown in FIG. 8. The algorithm 4, similar to algorithm 1 in FIG. 5, (CPU Max Min MM) works by dividing the ready queue of P processes into two lists (S504). List 1 contains n processes while list 2 contains m processes, where n+m=P. Algorithm 4 works on generating two-time quantum and dynamically selecting and assigning the time quantum to the candidate process which is close to the total execution time of that process. Algorithm 4 follows the process by averaging the total execution times of the processes in each list (S506, S508), in S910, the larger average will be the first quantum s and smaller average one will be second quantum t. The candidate process which needs to be assigned to CPU is compared with s and t.

Similar to algorithm 1 in FIG. 5, in S512, the scheduler checks if the ready queue 402 is empty. At the end of the ready queue, or when the ready queue 402 becomes empty, in S514, the scheduler determines an average waiting time and average turnaround time. The algorithm ends.

In S916, if the candidate process has total execution time more than t, it will be assigned time quantum s, otherwise it will be assigned time quantum t.

The pseudocode of the algorithm 4 is given below, where processList is the list of processes lying in ready queue, list 1 is first half of process list, list 2 is the second half of process list, r1 is relative value of list 1, r2 is relative value of list 2, quantum is time quantum assigned to process, len is length of process list, waitTime is waiting time for each process, turnTIme is turnaround time for each process, avgWTime is average waiting time for all processes and avgTTime is average turnaround time for all processes. Averages are calculated by the formula given in equations 1 and 2, while s and t are calculated as follows:

$$s_{(A1,A2)} = \frac{1}{2}(A1+A2+|A1-A2|) \qquad (4)$$

$$t_{(A1,A2)} = \frac{1}{2}(A1+A2+|A1-A2|) \qquad (5)$$

Similar to algorithm 1 in FIG. 5, in S518, the scheduler detects whether the remaining burst time is less than the time quantum. When "YES" in S518, in S520, the scheduler calculates waiting time and turn around time and moves the process out of Ready Queue 402. Otherwise, "NO" in S518, in S524, the scheduler calculates the waiting time and turn around time.

Pseudocode as an example implementation of Algorithm 4 is as follows:

```
list1←0 list2←0, r1←0, r2←0, quantum←0, s, t, v ← 0
m←len/2
r1←sum(list1)/m
r2←sum(list2)/(len-m)
    s←r1
    t←r2
    v←mid (processList)
sum←0, waitTime←0, turnTime←0, avgWTime←0, avgTTime←0, mid←0
max←Max(s, Max(t, v))
min←Min(s, Min(t, v))
IF s < t && t < v || v < t && t < s))
THEN mid = t
    ELSE IF t < s && s<v || v < s && s < t
        mid = t
    ELSE
        mid = v
DO FOR i ← 0 to len
        IF bt__i < max && bt__i < mid
            THEN quantum = min
            ELSE IF bt__i < max && bt__i == mid
                THEN quantum = mid
            ELSE quantum = max;
    IF bt__i__ > quantum
    THEN bt__i__ = quantum
    FOR j ←0 to len
        THEN if j! = i && bt__j__! = 0
        THEN waitTime__j__+=quantum
    ELSE
        FOR j←0 to len
        Then if j! = i && bt__j__! = 0
        Then waitTime __j__+=bt[i]
bt__i__←0
```

-continued

```
FOR k←0 to len
   sum←sum+bt_k
WHILE sum !=0
   FOR l←0 to len
   turnTime_i_←waitTime_i_+processList_i
   FOR j←0 to len
   avgWTime +=waitTime_j
   FOR j←0 to len
      avgTTime+=turnTime_j
```

Figure 10A:
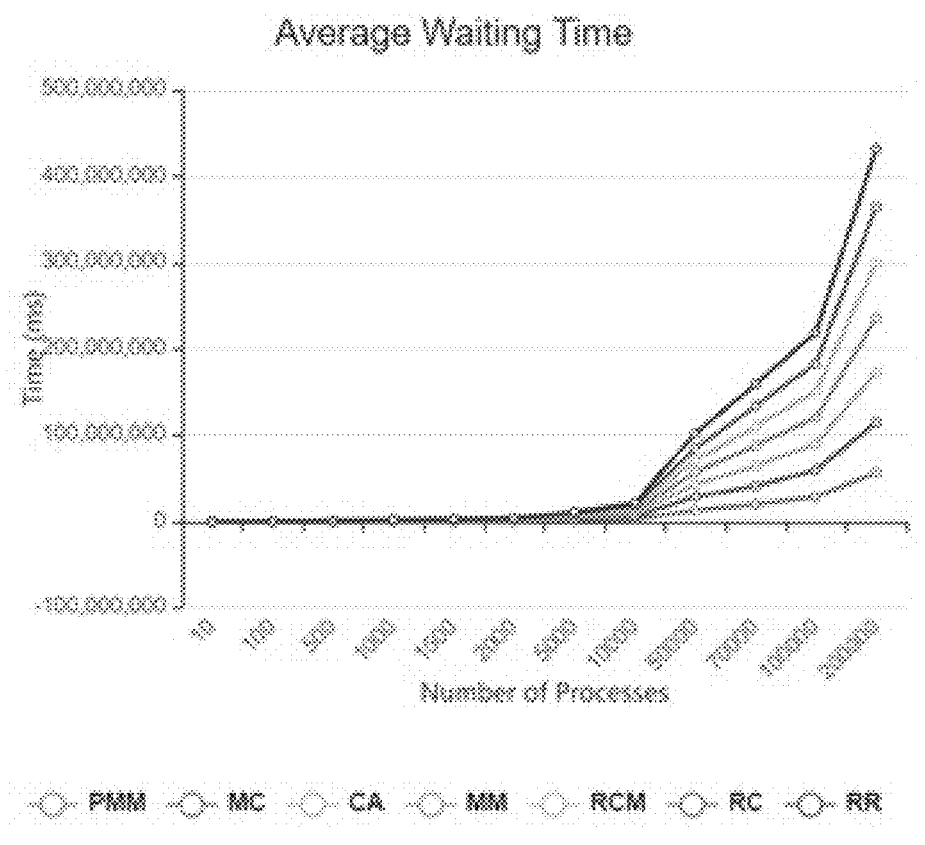
FIG. 10A is a graph of average waiting time and FIG. 10B is a graph of average turnaround time.

Algorithms are compared with each other as well as with a Relative Concatenate algorithm (RC) and a Relative Concatenate Minus (RCM), see H. Gull et al. (2019). All algorithms are also compared with RR (Round Robin) algorithm for clearly evaluating the performance of these algorithms, see A. Silberschatz et al. (2005). Proposed algorithms, Round Robin and other algorithms are implemented in C# and are given same random data set to compare their performance, see S. Bibi et al. (2010) and H. Gull et al. (2019). Algorithms are compared based on the average waiting and average turnaround time of these algorithms. As average waiting and average turnaround time depends on the number of processes residing in ready queue, an increase in the time leads to increase in cost. FIG. 10A shows the comparison of algorithms in terms of average waiting time. The stacked line chart is plotted for 10 to 200000 processes lying in the ready queue. The average waiting time taken by the processes is given in milliseconds and is plotted against y-axis, while x-axis plot the number of processes residing in ready queue. The performance of PMM is relatively better than other algorithms, followed by MC and CC. They show significant improvements in their performance if compared with RR which has almost double average waiting time. Results also indicate that as the number of processes is increasing in the ready queue PMM, MC and CC show significant change and improvement in their behavior. Relative Concatenate and Relative Concatenate Minus shows almost similar behavior to Round Robin, whereas proposed algorithms show performance improvement in a large number of processes, see H. Gull et al. (2019). Disclosed algorithms can also be compared with efficient SJRR algorithm which takes the average execution time of processes residing in a ready queue and assigns an average time slice to each process, see S. Bibi et al. (2010). Disclosed algorithms behave similar, as far as a smaller number of processes is concerned, but as the number of processes increases, the performance of SJRR shows upward trends in waiting time of each process. Overall, as presented in line chart, the average waiting time for RR is constantly showing an upward trend as compared to disclosed algorithms. It supports the fact that disclosed algorithm can be used in scheduling of processes in CPU.

Figure 10B:
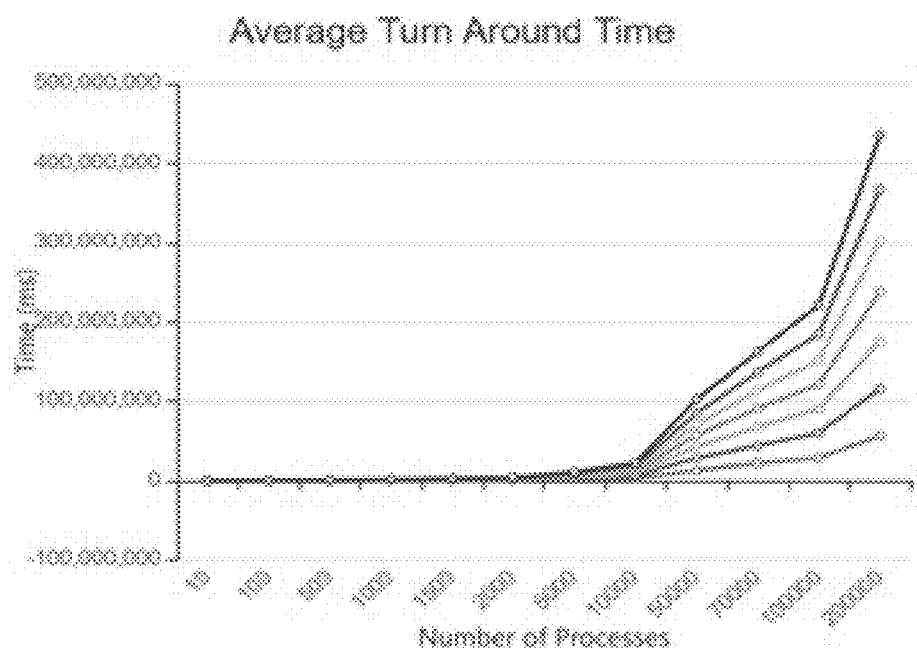

A similar pattern can be observed in the behavior of algorithms in terms of average turnaround time given in FIG. 10B. PMM shows better performance as compared to the other algorithms. PMM does not show much of a difference as far as smaller number of processes is concerned. But as the number of processes increases, difference in average turnaround time gradually increases. This highlights the observation that the proposed algorithm can help resource optimization in a CPU, if the CPU has many processes waiting in the ready queue. PMM is followed by MC, as performance is improved as compared to RR.

This performance improvement can also be supported by the logic behind the disclosed algorithms which dynamically selects the time slice as compared to the RR which has a static time slice for all the processes residing in ready queue. All four proposed variations of RR algorithm have been compared with RC and RCM algorithms where disclosed algorithms showed significant improvements in average turnaround time of the processes as the number of processes is increasing in the ready queue. Overall, average turnaround time taken by algorithms 1-4 is less than that of Round Robin which highlights the fact that the performance of the disclosed algorithms has significantly improved and aids resource use and allocation in computers.

Numerous modifications and variations of the present disclosure are possible in light of the above teachings. It is therefore to be understood that within the scope of the appended claims, the invention may be practiced otherwise than as specifically described herein.

The invention claimed is:

1. A scheduling method in a real time operating system for a central processing unit (CPU) for running a number of and diverse set of processes, for an Internet of Things network, in a ready queue, the scheduling method, performed in the CPU, for assigning time quantum to each process in the ready queue, comprises:
   dividing, by a scheduler having circuitry including program instructions configured for calculating, the ready queue having P processes into two lists, list 1 contains n processes while list 2 contains m processes, where n+m=P;
   averaging total execution times of the n and m processes in each list to get Avg1 and Avg2;
   generating a first time quantum s based on an average Avg1 and Avg2 of each list;
   generating a second time quantum t, different from the first time quantum s, based on the average Avg1 and Avg2 of each list;
   comparing total execution time of a candidate process which needs to be assigned to the CPU with each of the time quantum values s and t;
   dynamically selecting and assigning, by the scheduler, one of the time quantum s or the time quantum t, based on the comparing, as the assigned time quantum value closest to the total execution time of the candidate process, which is a time period for running the candidate process on the CPU;
   running, by the CPU, the candidate process within the assigned time quantum value; and
   repeating the scheduling method while processes are in the ready queue.

2. The scheduling method of claim 1, further comprising:
   selecting, by the scheduler, a scheduling process from among a plurality of scheduling processes based on a characteristic of the processes in the ready queue, the selected scheduling process is performed according to the scheduling method.

3. The scheduling method of claim 2, wherein the selecting a scheduling process is performed for different sets of P processes in the ready queue.

4. The scheduling method of claim 1, wherein
the generating the first time quantum s is based on a sum of the averages,
the generating the second time quantum t is based on differences of the averages;
further comprising:
taking a middle time quantum v of the whole list of processes lying in the ready queue;
and
the comparing includes comparing a candidate process which needs to be assigned to the CPU with the time quantum values v, s and t.

5. The scheduling method of claim 1, wherein
the generating the first time quantum s is the average of the list 1,
the generating the second time quantum t is the average of the list 2; further comprising:
taking the middle time quantum v of the whole list of processes lying in ready queue,
and
the comparing includes comparing a candidate process which needs to be assigned to the CPU with the time quantum values v, s and t.

6. The scheduling method of claim 1, wherein
a larger average of the list 1 and the list 2 is the time quantum s,
a smaller average of the list 1 and the list 2 is the time quantum t,
the comparing includes comparing a candidate process which needs to be assigned to the CPU with the time quantum values s and t, and
if the candidate process has total execution time more than t, assigning time quantum s to the candidate process, otherwise, assigning time quantum t to the candidate process.

7. A scheduler in a real time operating system for a central processing unit (CPU) for running a number of and diverse set of processes, for an Internet of Things network, in a ready queue, the scheduler when executed by the CPU performs steps comprising:
assigning time quantum to each process in the ready queue by
dividing the ready queue having P processes into two lists, list 1 contains n processes while list 2 contains m processes, where n+m=P;
averaging total execution times of the n and m processes in each list to get Avg1 and Avg2;
generating a first time quantum s based on an average Avg1 and Avg2 of each list;
generating a second time quantum t, different from the first quantum s, based on the average Avg1 and Avg2 of each list;
comparing total execution time of a candidate process which needs to be assigned to the CPU with each of the time quantum values s and t;
dynamically selecting and assigning one of the time quantum s or the time quantum t, based on the comparing, as the assigned time quantum value closest to the total execution time of the candidate process, which is a time period for running the candidate process on the CPU;
running, by the CPU, the candidate process within the assigned time quantum value; and
repeating the steps while processes are in the ready queue.

8. The scheduler of claim 7, wherein the central processing unit comprises a plurality of cores,
wherein the ready queue is a shared structure accessed by the plurality of cores, and
wherein each of the plurality of cores executes the scheduler.

9. The scheduler of claim 7, wherein in executing the scheduler
the generating the first time quantum s is based on a sum of the averages,
the generating the second time quantum t is based on differences of the averages,
the scheduler takes the middle time quantum v of the whole list of processes lying in the ready queue,
and
the comparing includes comparing a candidate process which needs to be assigned to the CPU with the time quantum values v, s and t.

10. The scheduler of claim 7, wherein in executing the scheduler
the generating the first time quantum s is the average of the list 1,
the generating the second time quantum t is the average of the list 2,
the scheduler takes the middle time quantum v of the whole list of processes lying in ready queue,
and
the comparing includes comparing a candidate process which needs to be assigned to the CPU with the time quantum values v, s and t.

11. The scheduler of claim 7, wherein in executing the scheduler
a larger average of the list 1 and the list 2 is the time quantum s,
a smaller average of the list 1 and the list 2 is the time quantum t,
the comparing includes comparing a candidate process which needs to be assigned to the CPU with the time quantum values s and t, and
if the candidate process has total execution time more than t, assigning time quantum s to the candidate process, otherwise, assigning time quantum t to the candidate process.

12. An embedded real time operating system for a microcontroller for running a number of and diverse set of processes, for an Internet of Things network, in a ready queue, the embedded real time operating system comprising a scheduler, the scheduler when executed in the microcontroller performs steps comprising:
assigning time quantum to each process in the ready queue;
dividing the ready queue having P processes into two lists, list 1 contains n processes while list 2 contains m processes, where n+m=P;
averaging total execution times of the processes in each list to get Avg1 and Avg2;
generating a first time quantum s based on an average Avg1 and Avg2 of each list;
generating a second time quantum t, different from the first quantum s, based on the average Avg1 and Avg2 of each list;
comparing total execution time of a candidate process which needs to be assigned to the central processing unit (CPU) of the microcontroller with the time quantum values s and t;
dynamically selecting and assigning one of the time quantum s or the time quantum t, based on the comparing, as the assigned time quantum value closest to the total execution time of the candidate process, which is a time period for running the candidate process on the CPU;

running, by the CPU, the candidate process within the assigned time quantum value; and repeating the steps while processes are in the ready queue.

13. The embedded real time operating system of claim 12, wherein the CPU comprises a plurality of cores,
   wherein the ready queue is a shared structure accessed by the plurality of cores, and
   wherein each of the plurality of cores executes the scheduler.

14. The embedded real time operating system of claim 12, wherein in executing the scheduler
   the generating the first time quantum s is based on a sum of the averages,
   the generating the second time quantum t is based on a differences of the averages,
   the scheduler takes the middle time quantum v of the whole list of processes lying in the ready queue, and
   the comparing includes comparing a candidate process which needs to be assigned to the CPU with the time quantum values v, s and t.

15. The embedded real time operating system of claim 12, wherein in executing the scheduler
   the generating the first time quantum s is the average of the list 1,
   the generating the second time quantum t is the average of the list 2,
   the scheduler takes the middle time quantum v of the whole list of processes lying in ready queue, and
   the comparing includes comparing a candidate process which needs to be assigned to the CPU with the time quantum values v, s and t.

16. The embedded real time operating system of claim 12, wherein in executing the scheduler
   a larger average of the list 1 and the list 2 is the time quantum s,
   a smaller average of the list 1 and the list 2 is the time quantum t,
   the comparing includes comparing a candidate process which needs to be assigned to the CPU with the time quantum values s and t, and
   if the candidate process has total execution time more than t, assigning time quantum s to the candidate process, otherwise, assigning time quantum t to the candidate process.

* * * * *